(12) United States Patent
Bailey

(10) Patent No.: US 11,465,558 B2
(45) Date of Patent: Oct. 11, 2022

(54) ADDED FUNCTIONALITY VEHICLE FLOOR MAT

(71) Applicant: Ada Cannon Bailey, Charlton, NY (US)

(72) Inventor: Ada Cannon Bailey, Charlton, NY (US)

( * ) Notice: Subject to any disclaimer, the term of this patent is extended or adjusted under 35 U.S.C. 154(b) by 0 days.

(21) Appl. No.: 17/108,136

(22) Filed: Dec. 1, 2020

(65) Prior Publication Data

US 2021/0162920 A1 Jun. 3, 2021

Related U.S. Application Data

(60) Provisional application No. 62/942,592, filed on Dec. 2, 2019.

(51) Int. Cl.
*B60Q 9/00* (2006.01)
*B60N 3/04* (2006.01)
*G08B 21/06* (2006.01)

(52) U.S. Cl.
CPC ............... *B60Q 9/00* (2013.01); *B60N 3/04* (2013.01); *G08B 21/06* (2013.01)

(58) Field of Classification Search
CPC .......... G06Q 30/0244; G06Q 30/0252; G06Q 30/0266; G06Q 30/0267; G06Q 50/30; G06Q 2240/00; G06Q 30/0284; G06Q 10/06; G06Q 10/083; G06Q 20/20; G06Q 20/206; G06Q 20/3672; G06Q 20/3674; G06Q 20/3676; G06Q 20/382; G06Q 20/3821; G06Q 20/385; G06Q 20/40; G06Q 20/4012; G06Q 20/40145; G06Q 30/06; G06Q 40/02; G06Q 50/22; G06Q 10/02; G06Q 30/016; G06Q 30/0645; G06Q 10/107; G06Q 30/0242; G06Q 30/0254; G06Q 30/0264; G06Q 30/0272; G06Q 30/0273; G06Q 40/08; H04L 63/102; H04L 2209/56; H04L 2209/805; H04L 63/0853; H04L 63/0861; H04L 9/30; H04L 9/32; H04L 9/3231; H04L 9/3271; H04L 9/3278; H04L 1/0038; H04L 1/0045; H04L 25/0202; H04L 25/0204; H04L 25/0224; H04L 29/04; H04L 41/24; H04L 5/0007; H04L 5/0035; H04L 5/0044; H04L 5/0092; H04L 63/0428; H04L 63/0435; H04L 63/08; H04L 65/60; H04L 1/203; H04L 2209/12; H04L 25/03057; H04L 25/03; H04L 51/22; H04L 7/0079; H04L 9/0866; A61B 34/37; A61B 34/74;
(Continued)

(56) References Cited

U.S. PATENT DOCUMENTS 10,290,241 B2 * 5/2019 Johnson ................. B60Q 3/745
2003/0155796 A1 * 8/2003 DePaulis .................. B60N 2/60
297/229

(Continued)

*Primary Examiner* — Daniel Previl
(74) *Attorney, Agent, or Firm* — DLA Piper LLP (US)

(57) ABSTRACT

A system for preventing sleep in vehicle operators can include a user device and a mat operatively connected to the user device and positioned on a driver-side floor of a vehicle. The mat can be configured to, via one or more processors, receive an enablement signal from the user device; and in response to receiving the enablement signal, cause a haptic effects generator to generate vibrations within the mat.

15 Claims, 3 Drawing Sheets

(58) Field of Classification Search
CPC ... A61B 2034/301; A61B 34/30; A61B 34/35; A61B 34/76; A61B 34/71; A61B 17/29; A61B 2034/306; A61B 2034/742; A61B 2090/371; A61B 2017/00115; A61B 2017/00119; A61B 2017/00123; A61B 2034/102; A61B 2034/302; A61B 34/70; A61B 34/77; A61B 90/03; A61B 90/361; A61B 90/37; A61B 90/50; A61B 2017/00314; A61B 2017/00323; A61B 2017/00973; A61B 34/20; A61B 34/25; B25J 3/04; B25J 9/1689; B25J 13/025; B25J 11/008; B25J 13/02; B25J 13/04; B25J 13/065; B25J 15/0019; B25J 15/0028; B25J 15/0066; B25J 19/06; B25J 9/1605; B25J 9/1612; B25J 9/1664; B25J 9/1674; B25J 9/1676; G06F 21/32; G06F 21/35; G06F 21/6245; G06F 2221/2115; G06F 11/006; G06F 11/3031; G06F 11/325; G06F 11/328; G06F 16/2237; G06F 16/2264; G06F 16/2282; G06F 3/0482; G06F 3/04842; G06F 3/0622; G06F 3/0659; G06F 3/0679; G06F 11/1004; G06F 11/1048; G06F 15/7821; G06F 1/26; G06F 1/263; G06F 1/3228; G06F 1/3275; G06F 1/3287; G06F 21/602; G06F 2221/2111; G06F 30/392; G06F 3/011; G06F 3/0412; G06F 3/04166; G06F 3/04184; G06F 3/0445; G06F 3/0446; G06F 3/0481; G06F 3/04817; G06F 3/0483; G06F 9/3001; G06F 9/30029; G06F 9/30043; G06F 9/30189; G06F 9/3836; G07C 9/257; G07C 9/26; G07C 9/27; G07C 5/008; G07C 5/0816; G07C 5/085; G07C 9/29; G16H 10/60; G11C 7/20; G11C 7/24; G11C 11/4087; G11C 11/413; G11C 11/419; G11C 2029/4402; G11C 11/4091; G11C 11/418; G11C 11/4074; G11C 11/4076; G11C 11/4082; G11C 11/54; G11C 17/18; G11C 5/143; G11C 5/147; G11C 7/02; G11C 7/222; G11C 8/18; G11C 11/1673; G11C 11/1693; G11C 11/1695; G11C 11/406; G11C 11/4093; G11C 11/4094; G11C 11/4096; G11C 11/4097; G11C 13/0061; G11C 16/00; G11C 16/0433; G11C 16/0483; G11C 16/08; G11C 16/10; G11C 16/24; G11C 16/30; G11C 16/32; G11C 17/00; G11C 2029/0411; G11C 2207/2227; G11C 2207/2254; G11C 29/52; G11C 29/787; G11C 29/789; G11C 29/806; G11C 29/842; G11C 5/025; G11C 5/063; G11C 5/14; G11C 5/148; G11C 7/06; G11C 7/1021; G11C 7/1039; G11C 7/1045; G11C 7/1063; G11C 7/1069; G11C 7/1072; G11C 7/1078; G11C 7/1084; G11C 7/1087; G11C 7/109; G11C 7/1096; G11C 7/18; G11C 8/04; G11C 8/06; G11C 8/10; G11C 8/12; A01K 15/023; A01K 15/021; A01K 27/009; A01K 29/005; G05B 2219/39024; G05B 2219/40195; G05B 19/4061; G05B 2219/35419; G05B 2219/36422; G05B 2219/39135; G05B 2219/39439; G05B 2219/40144; G05B 2219/45117; G05B 2219/45118; G05B 2219/49157; G08B 29/145; G08B 21/18; G08B 5/36; G08B 13/2411; G08B 13/2417; G08B 13/242; G08B 13/2434; G08B 13/246; G08B 21/0225; G08B 21/0236; G08B 21/0261; G08B 21/0269; G08B 21/06; G08C 23/04; G08C 17/02; G09C 1/00; G09G 2320/0247; G09G 2320/064; G09G 3/3406; G09G 2310/06; G09G 2320/0646; G09G 2320/10; G09G 3/36; G09G 2310/0264; G09G 2310/08; H01L 2924/00014; H01L 2224/13099; H01L 2224/13025; H01L 2224/16145; H01L 2224/16225; H01L 2224/17181; H01L 2225/06513; H01L 2225/06517; H01L 2225/06541; H01L 2225/06596; H01L 22/14; H01L 22/34; H01L 23/481; H01L 24/13; H01L 24/16; H01L 24/17; H01L 25/0657; H01L 27/0266

USPC .......... 340/441, 444, 464, 466, 515, 538.15, 340/641, 670, 691.6, 7.6, 14.63

See application file for complete search history.

(56) References Cited

U.S. PATENT DOCUMENTS

| | | | |
|---|---|---|---|
| 2005/0248462 A1* | 11/2005 | Cece | G08B 21/06 340/575 |
| 2009/0015400 A1* | 1/2009 | Breed | G07C 9/28 340/539.22 |
| 2011/0095155 A1* | 4/2011 | Milella, Jr. | A47F 5/0006 248/339 |
| 2012/0220819 A1* | 8/2012 | Madl | B62B 9/22 600/26 |
| 2015/0182160 A1* | 7/2015 | Kim | A61B 5/7475 600/301 |
| 2015/0277559 A1* | 10/2015 | Vescovi | G06F 1/163 345/173 |
| 2016/0217531 A1* | 7/2016 | Ishikawa | G06Q 40/08 |
| 2017/0158186 A1* | 6/2017 | Soifer | B60H 1/00742 |
| 2018/0027638 A1* | 1/2018 | Takacs | H05B 47/105 315/308 |
| 2018/0126263 A1* | 5/2018 | Seiler | G09B 5/06 |
| 2019/0385431 A1* | 12/2019 | Copperman | G08B 7/00 |
| 2020/0079323 A1* | 3/2020 | Saez | B60R 25/33 |

* cited by examiner

ADDED FUNCTIONALITY VEHICLE FLOOR MAT

CROSS-REFERENCE TO RELATED APPLICATION INFORMATION

This application claims priority to U.S. Provisional Application No. 62/942,592, filed on Dec. 2, 2019, which is incorporated herein by reference in its entirety.

BACKGROUND OF THE DISCLOSURE

Driving while sleepy, fatigued, or drowsy is a major problem in the United States and can pose serious dangers and tragic results to both drivers and others around them, such as other drivers and pedestrians. Drowsy driving can occur when a person hasn't slept enough, has untreated or undiagnosed sleep disorders, is on certain medications, is under the influence of drugs or alcohol, or performs hard labor such as shift work. Besides the obvious danger of falling asleep while driving, drowsy driving can have other potentially disastrous side effects such as a lesser ability to pay close attention to the road, slower reaction times, and even decision-making.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

The following detailed description is merely exemplary in nature and is not intended to limit the invention or the applications of its use.

Embodiments of the present disclosure relate to an added functionality floor mat for vehicles that can prevent drivers from inadvertently falling asleep. Vehicles compatible with the mat described herein can include passenger cars, trucks, commercial vehicles such as semitrucks or busses, and the like. The mat can be positioned similar to standard vehicle floor mats. For example, the mat can be positioned on the floor under a person's feet in the driver seat of a vehicle. In some embodiments, the added functionality vehicle floor mat can operate in a "sleep prevention mode", which can be enabled or disabled by a user via an application on a smartphone or similar device. In sleep prevention mode, the mat can intermittently vibrate. A user in a vehicle can set the vehicle mat to operate in sleep prevention mode while driving (e.g., late at night or when otherwise tired or drowsy); the intermittent vibrations of the mat can be felt by the user's feet while driving. These vibrations can either prevent the user from falling asleep or wake them up if they have briefly dosed off.

Figure 1:
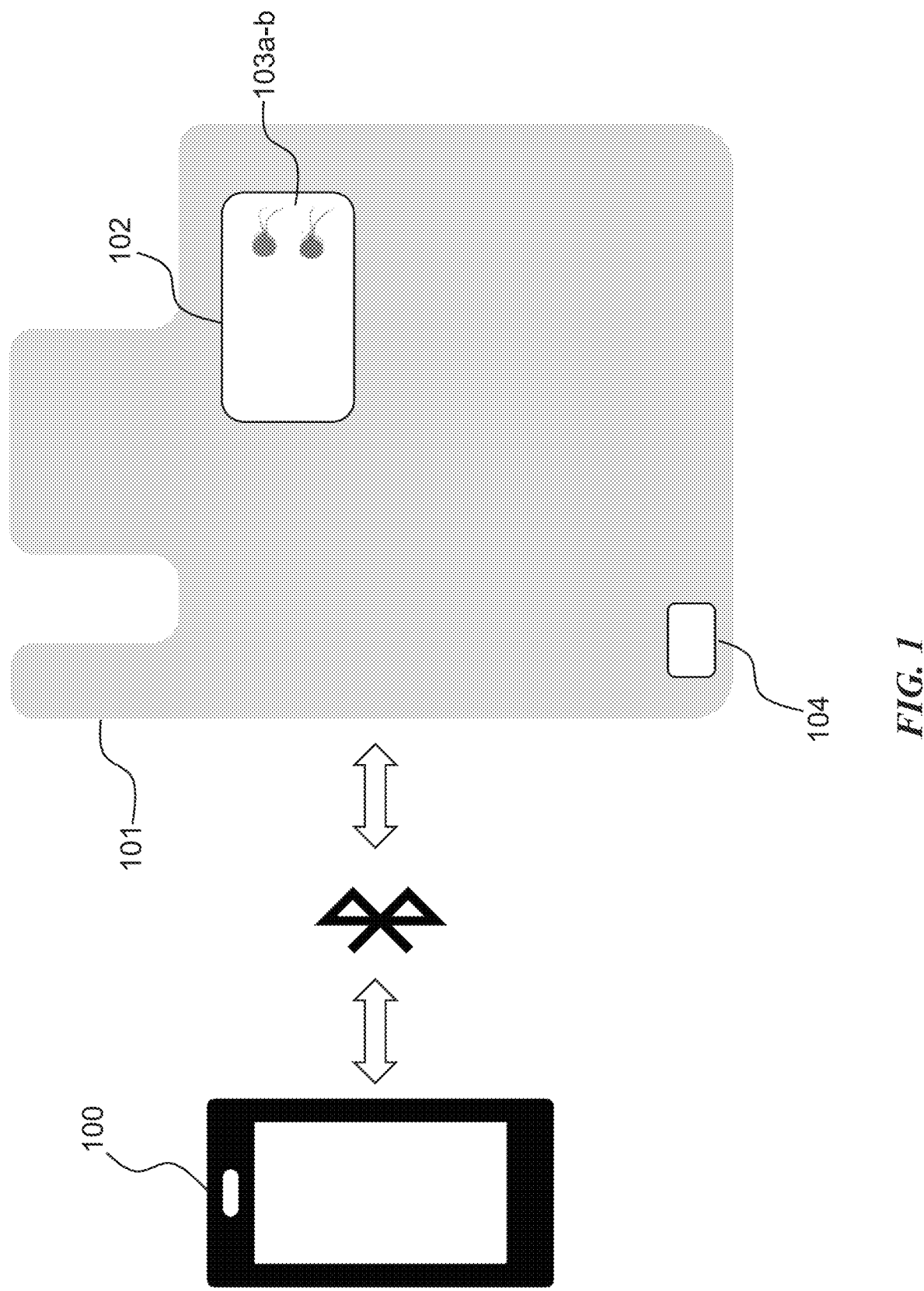
FIG. 1 shows a system that employs an added functionality vehicle floor mat, according to some embodiments of the present disclosure.

FIG. 1 shows a system that employs an added functionality vehicle floor mat, according to some embodiments of the present disclosure. The system of FIG. 1 can include a user device 100 and an added functionality floor mat 101. In some embodiments, the user device 100 can include a smartphone or other similar device capable of running an application and including Bluetooth™ or other wireless connectivity functionality. Added functionality floor mat 101 can be sized and configured for insertion into a vehicle. For example, added functionality floor mat 101 can be positioned onto or attached to the driver-side floor of a vehicle such that a driver of the vehicle can rest their feet on it while driving.

In some embodiments, added functionality floor mat 101 can include a heel pad 102. The heel pad 102 can comprise a textile or other similar material and can be positioned such that the heel of the right foot of a driver of the vehicle can rest on the pad while driving and controlling the gas pedal. In some embodiments, the heel pad 102 can be positioned such that the user's left heel rests on it while driving. In some embodiments, the heel pad can extend only part way to the left-hand edge of the added functionality floor mat 101 (as shown in FIG. 1). In other embodiments, the heel pad 102 can extend near or all the way to the left edge of the added functionality floor mat 101 (not shown). In some embodiments, heel pad 102 can include a haptic effects generator, such as one or more vibrational motors 103a-b (103 generally). The vibrational motors 103 can be embedded in or attached to the heel pad 102. In some embodiments, this positioning of the vibrational motors 103 can increase the likelihood of the user driving a vehicle sensing the vibrations. However, embodiments described herein are not limited to placing the vibrational motors 103 at the heel pad 102 and can be placed, attached, or embedded anywhere in or on the added functionality floor mat 101.

In some embodiments, added functionality floor mat 101 can also include a pouch 104 that includes additional components of the system, such as a printed circuit board, a battery, a processor, and a transceiver (e.g., a Bluetooth™ transceiver). In some embodiments, the pouch can include the components necessary to receive signals from the device 100 and cause the vibrational motors 103 to vibrate in accordance with the present disclosure. Additional details with respect to this componentry is described with respect to FIG. 2. In some embodiments, the pouch 104 can be attached or adhered to the underside of the added functionality floor mat 101, which may make the components less likely to be damaged by a user's feet. However, embodiments described herein are not limited to placing the pouch 104 and associated componentry at the lower left corner of the added functionality floor mat 101; for example, the pouch 104 can be positioned at the lower right corner of the added functionality floor mat 101 or any other section of the mat, including the heel pad 102.

Figure 2:
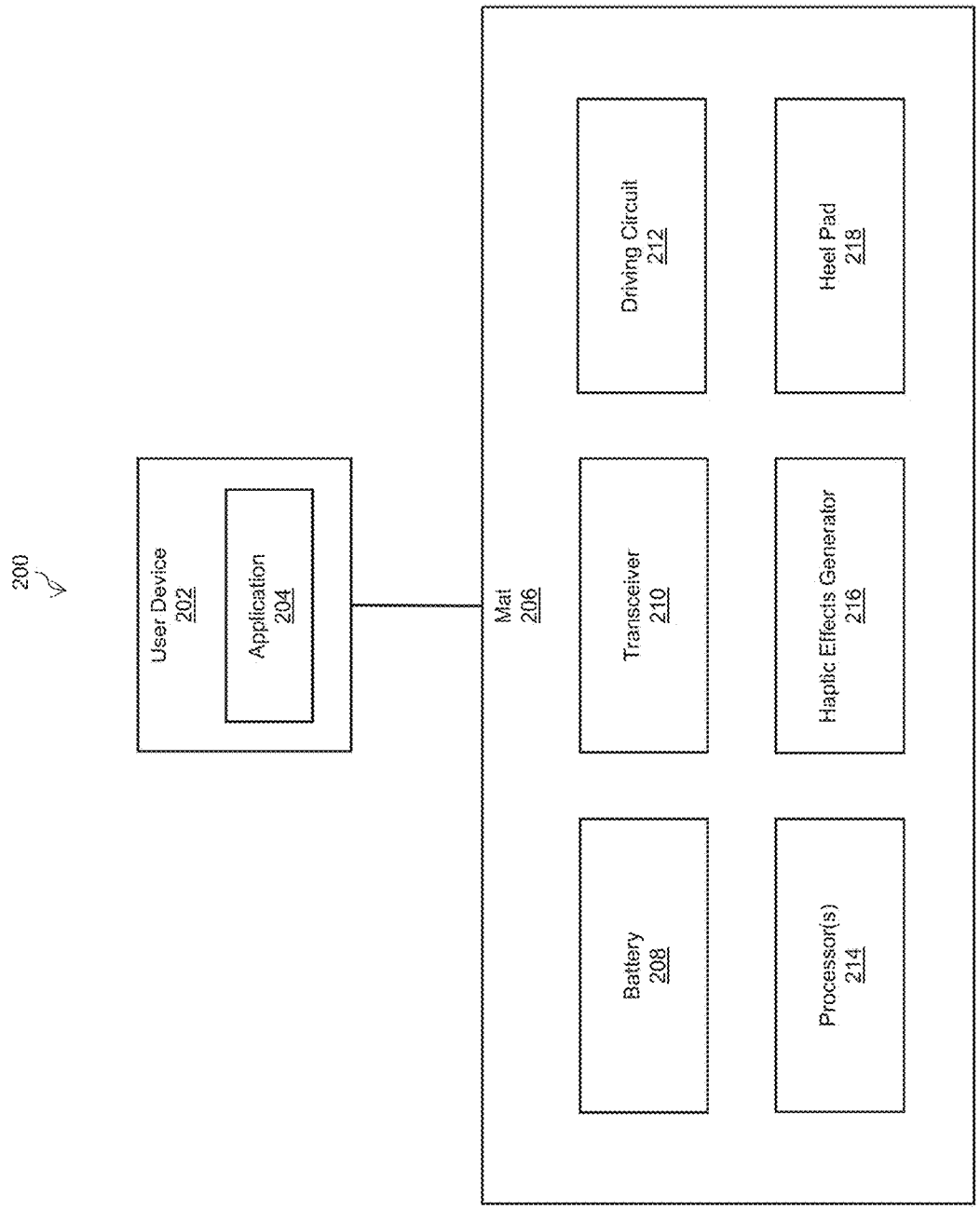
FIG. 2 shows a block diagram of a system that employs an added functionality vehicle floor mat, according to some embodiments of the present disclosure.

FIG. 2 shows a block diagram of a system 200 that employs an added functionality vehicle floor mat (e.g., added functionality floor mat 101 of FIG. 1), according to some embodiments of the present disclosure. In some embodiments, system 200 can include a user device 202 communicably coupled to an added functionality mat 206 (herein referred to as mat 206). The connection can be wireless (e.g., via Bluetooth™ or WiFi) or wired. User device 202 can include an installed application 204 by which a user can control and/or provide commands to the 206. For example, a user can, via application 204, select a sleep prevention mode which would send an associated signal to the mat 206 to initiate operation. A user can also disable a sleep prevention mode via the application 204.

Mat 206 can, similar to as described in relation to FIG. 1, be positioned on the driver-side floor of a vehicle such that a driver's feet can rest on the mat while driving. In some embodiments, mat 206 can include a battery 208, a transceiver 210 (e.g., a Bluetooth™ transceiver), a driving circuit 212, one or more processors 214 (herein referred to as processor 214), a heel pad 218, and a haptic effects generator 216. Battery 208 can be configured to provide a power supply to transceiver 210, driving circuit 212, processor 214, and haptic effects generator 216 within the mat 206. Transceiver 210 can be configured to receive signals from device 202, such as a signal that initiates or disables a sleep prevention mode. Mat 206 can also include a heel pad 218, which can be similar to or the same as heel pad 102 of FIG. 1.

Processor 214 can be configured to, in response to an enablement signal being received by the transceiver 210, cause the driving circuit to 212 to drive the haptic effects generator 216 to initiate vibrations. In some embodiments, haptic effects generator 216 can include multiple motors, such as motors 103a-b of FIG. 1. The vibrations generated by haptic effects generator 216 can propagate across the mat 206 and be sensed by the foot of the driver of the vehicle, which can either prevent them from falling asleep, help them to maintain focus levels, or wake them up if they have briefly dosed off. In some embodiments, haptic effects generator 216 can be attached to or embedded within heel pad 218, such as described in relation to FIG. 1. In some embodiments, battery 208, transceiver 210, driving circuit 212, and processor 214 can be contained within a separate pouch (e.g., pouch 104) attached at the underside of the mat 206.

In some embodiments, once a sleep prevention mode has been enabled, haptic effects generator 216 can be configured to generate intermittent vibrations or vibrations at an intermittent rate until a disabling signal has been received from user device 202. For example, the intermittent rate may be a regular periodic rate, such as vibrations for ten seconds once per minute, or may be a random or pseudorandom rate. In some embodiments, random rates can include random variations in at least one of the duration of vibrations and the period between the vibrations.

In some embodiments, the system 200 can also operate in a "speed notification" mode. For example, similar to enabling the disclosed sleep prevention mode, a user can enable a speed notification mode via the application 204. In addition, when enabling a speed notification mode, the user can be given the option to set a desired speed limit and/or a tolerance or threshold (e.g., five mph over the selected speed limit). If the vehicle in which the mat 206 is placed begins to move at a speed over the set speed limit, the haptic effects generator 216 can vibrate, notifying the driver.

In some embodiments, the determination of an excessive speed of the vehicle can be made by the application 204 on user device 202. In response to such a determination, the application 204 can send a notification message to the processor 214. In response to this message, the processor 214 can be configured to cause, via driving circuit 212, the haptic effects generator 216 to vibrate, warning the driver that they are exceeding the applicable speed limit and any applicable tolerance. The application 204 can utilize GPS functionality in the device 202 to determine the vehicle's speed and location and can use a database to determine the applicable speed limit based on the location. For example, the database may be stored in the memory of the device 202 or can be accessed from a cloud-based server.

In some embodiments, the determination of excess speed can be made by the processor 214 in the mat 206. For example, the application 204 can be configured to determine speed and location information for the vehicle and send that information via Bluetooth™ to the processor 214 at a periodic rate (e.g., once per second). The processor 214 can then use the speed and location information to determine the applicable speed limit by querying a database stored in a memory on the mat 206 (e.g., such as on a printed circuit board or elsewhere on the mat 206) and can compare the applicable speed limit, any applicable tolerance, and the speed reported by the application 204. If the comparison indicates an excessive speed, the processor 214 can cause the haptic effects generator 216 to vibrate, warning the driver. In some embodiments, the haptic effects generator 216 can vibrate for three successive periods (2-5 seconds) separated by short periods (1-2 seconds) of non-vibrations. In some embodiments, performing the speed comparison at the mat 206 can increase data security and decrease the likelihood that unauthorized parties can gain access to that information.

Figure 3:
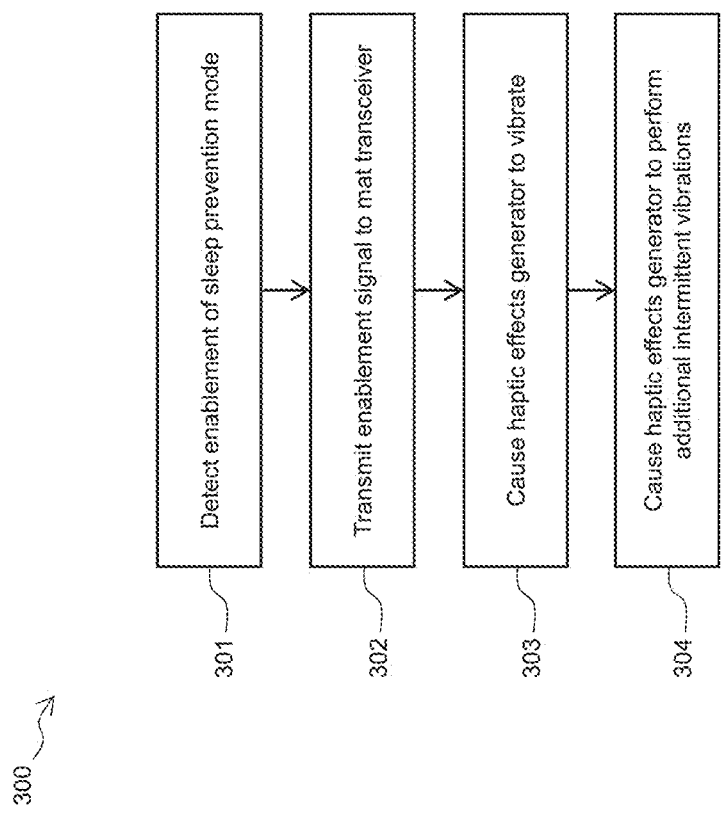
FIG. 3 shows an example process that can occur within a system that employs an added functionality vehicle floor mat, according to some embodiments of the present disclosure.

FIG. 3 shows an example process 300 that can occur within the system 200 that employs an added functionality vehicle floor mat, according to some embodiments of the present disclosure. At block 301, an application on a smartphone or other similar device (e.g., device 202) can detect a user enablement of sleep prevention mode, such as an indicator or button being pressed on a touchscreen. At block 302, the device 202 can transmit an enablement signal to a transceiver 210 on an added functionality floor mat 206. At block 303, in response to receiving an enablement signal from the user device 202, one or more processors 214 on the mat 206 can cause a driving circuit 212 to initiate a haptic effects generator 216 to begin vibrations. At block 304, the one or more processors 214 can cause the haptic effects generator 216, via driving circuit 212, to perform additional intermittent vibrations until a disablement signal is received from the user device.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. An added functionality vehicle floor mat for preventing sleep in vehicle operators comprising:
   a mat;
   a haptic effects generator; and
   one or more processors configured to:
      receive an enablement signal; and
      in response to receiving the enablement signal, cause the haptic effects generator to generate intermittent vibrations separated by intervals between the intermittent vibrations within the mat, wherein at least a duration of the intermittent vibrations or a duration of the intervals between the intermittent vibrations varies randomly.

2. The added functionality vehicle floor mat of claim 1, wherein the enablement signal is received from a user device based on an indication made by a user on an application on the user device.

3. The added functionality vehicle floor mat of claim 1, wherein the haptic effects generator comprises at least one vibrational motor.

4. The added functionality vehicle floor mat of claim 1 further comprising a heel pad, wherein the haptic effects generator is embedded within the heel pad.

5. The added functionality vehicle floor mat of claim 1 further comprising a pouch attached to an underside of the mat, wherein the one or more processors are contained inside the pouch.

6. The added functionality vehicle floor mat of claim 5, wherein the pouch is positioned at a corner of the added functionality vehicle floor mat.

7. The added functionality vehicle floor mat of claim 1, wherein a duration of the intermittent vibrations varies randomly.

8. The added functionality vehicle floor mat of claim 1, wherein a duration of the intervals between the intermittent vibrations varies randomly.

9. The added functionality vehicle floor mat of claim 1, wherein the one or more processors are configured to:
   receive a disablement signal; and
   disable the vibrations.

10. A system for preventing sleep in vehicle operators comprising:
    a user device; and
    the mat of claim 1.

11. A method for preventing sleep in vehicle operators comprising:
    receiving, by at least one processor, a signal indicating enablement of a sleep prevention mode;
    in response to receiving the signal, causing, by the at least one processor, a haptic effects generator to generate intermittent vibrations, wherein the haptic effects generator is embedded in a vehicle floor mat;
    wherein the intermittent vibrations are separated by intervals between the intermittent vibrations and at least a duration of the intermittent vibrations or a duration of the intervals between the intermittent vibrations varies randomly.

12. The method of claim 11, wherein a duration of the intermittent vibrations varies randomly.

13. The method of claim 11, wherein a duration of the intervals between the intermittent vibrations varies randomly.

14. The method of claim 11, wherein receiving the signal comprises receiving the signal from a user device based on an indication made by a user on an application on the user device.

15. The method of claim 11 comprising:
    receiving a disablement signal; and
    in response to receiving the disablement signal, causing the haptic effects generator to stop generating vibrations.

* * * * *